United States Patent
Zhang et al.

(10) Patent No.: US 12,466,993 B2
(45) Date of Patent: Nov. 11, 2025

(54) CERAMIC TRACING PROPPANT

(71) Applicant: HENAN TIANXIANG NEW MATERIALS CO., LTD., Henan (CN)

(72) Inventors: Tiancheng Zhang, Henan (CN); Chunli Chang, Henan (CN); Jianguo Xue, Henan (CN); Xianwei Liu, Henan (CN); Junxia Wang, Henan (CN); Lifeng Shen, Henan (CN)

(73) Assignee: HENAN TIANXIANG NEW MATERIALS CO., LTD., Henan (CN)

( * ) Notice: Subject to any disclaimer, the term of this patent is extended or adjusted under 35 U.S.C. 154(b) by 0 days.

(21) Appl. No.: 18/824,816

(22) Filed: Sep. 4, 2024

(65) Prior Publication Data

US 2024/0425749 A1    Dec. 26, 2024

Related U.S. Application Data

(63) Continuation-in-part of application No. PCT/CN2022/093780, filed on May 19, 2022.

(30) Foreign Application Priority Data

Mar. 18, 2022   (CN) .......................... 202210273147.2

(51) Int. Cl.
    *C09K 8/80*   (2006.01)
(52) U.S. Cl.
    CPC ...................................... *C09K 8/80* (2013.01)
(58) Field of Classification Search
    None
    See application file for complete search history.

(56) References Cited

U.S. PATENT DOCUMENTS

| | | | |
|---|---|---|---|
| 2009/0205825 A1* | 8/2009 | Smith, Jr. | E21B 49/00 250/269.4 |
| 2010/0105579 A1* | 4/2010 | Pershikova | C09K 8/80 507/273 |
| 2011/0111990 A1* | 5/2011 | Pershikova | E21B 43/267 507/273 |

FOREIGN PATENT DOCUMENTS

| | | |
|---|---|---|
| CN | 1954132 | 4/2007 |
| CN | 101023243 | 8/2007 |

(Continued)

OTHER PUBLICATIONS

"International Search Report (Form PCT/ISA/210) of PCT/CN2022/093780", mailed on Jul. 27, 2022, with English translation thereof, pp. 1-6.

(Continued)

*Primary Examiner* — Andrew Sue-Ako
(74) *Attorney, Agent, or Firm* — JCIPRNET

(57) ABSTRACT

The present invention relates to a ceramic tracing proppant, and belongs to the field of oil and gas exploitation aids. The ceramic tracing proppant of the present invention is mainly prepared from a neutron absorbing material and the following raw materials in parts by weight: 60-90 parts of bauxite, 30-90 parts of kaolin, and 1-5 parts of fluorite. The ceramic tracing proppant of the present invention has a very high compressive strength under a relatively low density, can effectively prop formation cracks, ensure a fracturing effect and provide an efficient channel for oil and gas output, and has a wide raw material source and a relatively low cost. In addition, the neutron absorbing material is used and fused with an existing neutron logging technology, such that permanent tracing can be achieved under non-radioactive conditions, and the crack height can be effectively, accurately, and quantitatively determined.

9 Claims, 2 Drawing Sheets

(56) References Cited

FOREIGN PATENT DOCUMENTS

| | | |
|---|---|---|
| CN | 101617018 | 12/2009 |
| CN | 102007267 | 4/2011 |
| CN | 102304358 | 1/2012 |
| CN | 102352238 | 2/2012 |
| CN | 102692655 | 9/2012 |
| CN | 103965390 | 8/2014 |
| CN | 104694115 | 6/2015 |
| CN | 104963677 | 10/2015 |
| CN | 105131934 | 12/2015 |
| CN | 107288607 | 10/2017 |
| CN | 113236235 | 8/2021 |
| CN | 113549444 | 10/2021 |
| CN | 114456797 | 5/2022 |
| CN | 115161003 | 10/2022 |
| RU | 2608100 | 1/2017 |

OTHER PUBLICATIONS

"Office Action of China Counterpart Application", issued on Dec. 19, 2022, p. 1-p. 5.

"Decision of Refusal of China Counterpart Application", issued on Jun. 12, 2023, p. 1-p. 6.

Xiang-Hui Li et al., "Preparation and Properties Research of an Isotope-labeled Fracturing Proppant", Bulletin of the Chinese Ceramic Society, vol. 35, Dec. 2016, pp. 4261-4266.

Minhui Tang et al., "Research of Support Grains for Oil Well", Journal of Harbin University of Architecture and Engineering, vol. 28, Aug. 1995, pp. 73-76.

* cited by examiner

CERAMIC TRACING PROPPANT

CROSS-REFERENCE TO RELATED APPLICATION

This application is a continuation-in-part application of international application of PCT application serial no. PCT/CN2022/093780, filed on May 19, 2022, which claims the priority benefit of China application no. 202210273147.2, filed on Mar. 18, 2022. The entirety of each of the above-mentioned patent applications is hereby incorporated by reference herein and made a part of this specification.

TECHNICAL FIELD

The invention belongs to the field of oil and gas exploitation aids, and in particular relates to a ceramic tracing proppant.

RELATED ART

Proppant is a solid particle added to the cracks to play a supporting role during the fracturing construction in oil and gas fields in order to ensure that the cracks opened by the fracturing does not close after the pump is stopped. The proppant should meet the requirements of low density, high strength, and low cost so that the cracks can maintain strong conductivity and ensure the effect of fracturing construction.

When determining the effect of fracturing construction, it is necessary to measure the height of the fracturing cracks near the wellbore. The main logging technologies currently used are well temperature measurement and radioactive isotope measurement. The well temperature measurement technology uses the comparison between the temperature drop when the fracturing fluid is injected into the formation and the temperature of the formation before fracturing. By comparing the temperature curves, the heat exchange phenomenon in the formation can be inferred. The layer with the slowest temperature recovery is the layer that has received the most fracturing fluid. The advantage of this method is that it is simple and easy to operate, but cannot be measured quantitatively and can only roughly determine the height of the supporting crack, which has a large error.

The radioactive isotope measurement technology is to mix radioactive isotopes into the fracturing proppant during fracturing, and use a gamma meter to measure the radioactivity intensity within 0.3-0.6 m near the wellbore after fracturing construction. A variety of isotopes may be used for measurement to determine the amount of pre-fluid and the amount of sand carried under different sand ratio conditions, but the technology can only measure the upper and lower limits of the crack height, cannot effectively remove the influence of the borehole, has low measurement accuracy, and is radioactive, which affects construction safety.

In the prior art, a Chinese invention patent application with application publication number CN104963677A discloses a method for determining the height of fracturing cracks using proppant detection, by injecting proppants with high capture cross section materials into the cracks, the pulsed neutron logging instrument is used to measure the mixed gamma energy spectrum of the formation. After processing, the proppant position and crack height can be determined. This method uses bauxite as raw material to prepare proppant, and is equipped with gadolinium oxide combined with pulsed neutron logging technology for measurement. Although this method is non-radioactive, the proppant cannot guarantee the requirements of low density and high strength.

SUMMARY OF INVENTION

The purpose of the present invention is to provide a ceramic tracing proppant having the advantages of low density and high strength.

The technical solution adopted by the ceramic tracing proppant of the present invention is:

A ceramic tracing proppant is mainly prepared from a neutron absorbing material and the following raw materials in parts by weight: 60-90 parts of bauxite, 30-90 parts of kaolin, and 1-5 parts of fluorite. The ceramic tracing proppant of the present invention has the advantages of low density and high strength by controlling the ratio of the various raw materials, which can effectively prop formation cracks, ensure the fracturing effect, and provide an efficient channel for oil and gas output. At the same time, the neutron absorbing material of the present invention has good combination performance with other raw materials, and exerts the neutron source capture ability in the process of propping the crack, thereby a tracing function is provided.

After neutron pulses are emitted into the cracks through neutron logging technology, the neutron absorbing material distributed in the proppant produces a capture cross section response to the neutron source. Thermal neutron capture detection technology and imaging processing are used, which can eliminate the influence of proppant accumulation near the borehole, so as to intuitively grasp the crack initiation position and crack height, which has strong operability and high interpretation accuracy, and plays an important role in obtaining crack morphology, proppant laying conditions, and evaluation of transformation effects after fracturing.

Therefore, the ceramic tracing proppant of the present invention is fused with the existing neutron logging technology, such that permanent tracing can be achieved under non-radioactive conditions, and can be measured at any time without time limit, and the crack height can be effectively, accurately, and quantitatively determined, which is beneficial to intuitive and effective analysis of fracturing operations. Also, there is no residual pollution, no pollution to the operating pipe, and no radioactive return fluid, which meets the requirements of green chemical production, can also reduce construction costs, and has the advantages of a wide source of raw materials and low cost.

Preferably, in order to obtain more sensitive and accurate logging data and ensure the cost of raw materials, the neutron absorbing material is 1-5 parts in parts by weight.

Preferably, in order to ensure performance and reduce costs, the ceramic tracing proppant is mainly prepared from the following raw materials in parts by weight: 60-80 parts of bauxite, 30-40 parts of kaolin, 1-3 parts of fluorite, and 1-4 parts of the neutron absorbing material.

Furthermore, the ceramic tracing proppant is mainly prepared from the following raw materials in parts by weight: 65 parts of bauxite, 31 parts of kaolin, 1.5 parts of fluorite, and 2.5 parts of the neutron absorbing material; or the ceramic tracing proppant is mainly prepared from the following raw materials in parts by weight: 60 parts of bauxite, 30 parts of kaolin, 1 part of fluorite, and 1 part of the neutron absorbing material; or the ceramic tracing proppant is mainly prepared from the following raw materials in parts by weight: 90 parts of bauxite, 90 parts of kaolin, 5 parts of fluorite, and 5 parts of the neutron absorbing material; or the ceramic tracing proppant is mainly prepared from the following raw materials in parts by weight: 70 parts of bauxite, 60 parts of kaolin, 3 parts of fluorite, and 2 parts of the neutron absorbing material.

Preferably, the neutron absorbing material is selected from one or any combination of samarium oxide, hafnium oxide, gadolinium oxide, cadmium oxide, and boron carbide. The neutron absorbing materials have strong high-temperature stability and can still maintain excellent neutron absorption capabilities after experiencing the high-temperature environment of ceramic sintering.

Preferably, the neutron absorbing material comprises boron carbide. Boron carbide not only has a strong neutron capture ability, but the high structural strength thereof also enhances the compressive resistance of the proppant and can improve the temperature resistance of the proppant. The formation adaptability temperature is as high as 175° C., so that the proppant can adapt to the fracturing of deep wells and high-temperature formations, and the fracturing effect is further improved.

Preferably, the bauxite is mainly composed of the following components in weight percentage: $Al_2O_3$ 50-70%, $SiO_2$<30%, alkali metal oxide<2%; that is, in the bauxite, $Al_2O_3$ 50-70%, $SiO_2$<30%, and alkali metal oxide<2%. The kaolin is mainly composed of the following components in weight percentage: $Al_2O_3$ 40-55%, alkali metal oxide<2%; that is, in the kaolin, $Al_2O_3$ 40-55%, and alkali metal oxide<2%. The fluorite is mainly composed of the following components in weight percentage: $CaF_2$ 50-60%, that is, in the fluorite, $CaF_2$ 50-60%.

In the present invention, the alkali metal oxide contained in both bauxite and kaolin refer to $K_2O$ and $Na_2O$.

In the present invention, the fineness of the powder being above x mesh or the fineness being x mesh means that the passing rate of the powder on the screen with a mesh number of x reaches not less than 95%. The particle size being a/b mesh is implemented in accordance with the standard of "SYT5108-2014 Measurement of Properties of Proppants used in Hydraulic Fracturing and Gravel-Packing Operations".

Preferably, the particle size of the ceramic tracing proppant is 20/40 mesh.

Preferably, the ceramic tracing proppant is prepared by a method comprising the following steps: granulating a mixed powder composed of a formulated amount of bauxite powder, kaolin powder, fluorite powder, and neutron absorbing material powder, and sintering at 1350-1450° C. The ceramic tracing proppant of the present invention has a short preparation process, convenient raw material acquisition, controllable process parameters, can effectively detect and explain the crack height of fracturing construction, and can remove the influence of formations, and is suitable for large-scale industrial production. The neutron absorbing material can be evenly dispersed in the high-strength structure of the proppant through mixing, granulation, and high-temperature calcination processes, and is fused with other raw materials of the proppant, which has super strong neutron capture ability, and the tracing effect is ensured.

Furthermore, the $Al_2O_3$ and $SiO_2$ components in bauxite and kaolin can produce high-strength mullite and corundum crystal phases under high-temperature calcination at 1350-1450° C. to improve the compressive strength of the proppant, the clay component of kaolin can enhance the strength of the semi-finished product, and thereby the compressive ability of the finished product is increased. At the same time, the montmorillonite and mica contained in kaolin can generate high-strength monoclinic crystals inside the ceramsite, and the strength of the proppant is further improved. The addition of fluorite is beneficial to the growth of rod-shaped mullite phase, and can be combined with bauxite or kaolin to form rod crystals that play a toughening role as fibers or whiskers, which can significantly improve the strength of the proppant.

In addition, the alkali metal oxide content in the bauxite and kaolin raw materials of the present invention is controlled to be <2%. The lower alkali metal oxide content can avoid the sticking phenomenon during the sintering process and ensure the smooth progress of the sintering preparation.

Preferably, the sintering temperature is 1420° C.

Preferably, the granulation may be carried out by spray granulation. Specifically, the spray granulation may be performed by adding the mixed powder into a granulator while continuously spraying water mist, so that the mixed powder is continuously agglomerated under the bonding effect of water to perform granulation.

Preferably, the method for preparing the ceramic tracing proppant further comprises drying the semi-finished product obtained by sieving after spray granulation at 180-200° C. Preferably, the drying time is 30 minutes.

Preferably, after granulation, the semi-finished product is screened using an 18/40 mesh series screen.

Preferably, in order to meet the requirements and control the production cost, the fineness of the bauxite powder, the kaolin powder, the fluorite powder, and the neutron absorbing material powder is 400-600 mesh, that is, the passing rate of the raw material powders passing through a 400 mesh screen reaches not less than 95%, and the passing rate of the raw material powders passing through a 600 mesh screen reaches not less than 95%.

Furthermore, the fineness of the bauxite powder, the kaolin powder, the fluorite powder, and the neutron absorbing material powder is 550 mesh, that is, the passing rate of the raw material powders passing through the 550 mesh screen reaches not less than 95%.

Preferably, the sintering time is 6-10 hours. Furthermore, the sintering time is 8 hours.

Preferably, the obtained ceramic tracing proppant is cooled after sintering, and then screened with a 20/40 mesh series screen after cooling.

DESCRIPTION OF EMBODIMENTS

Figure 1:
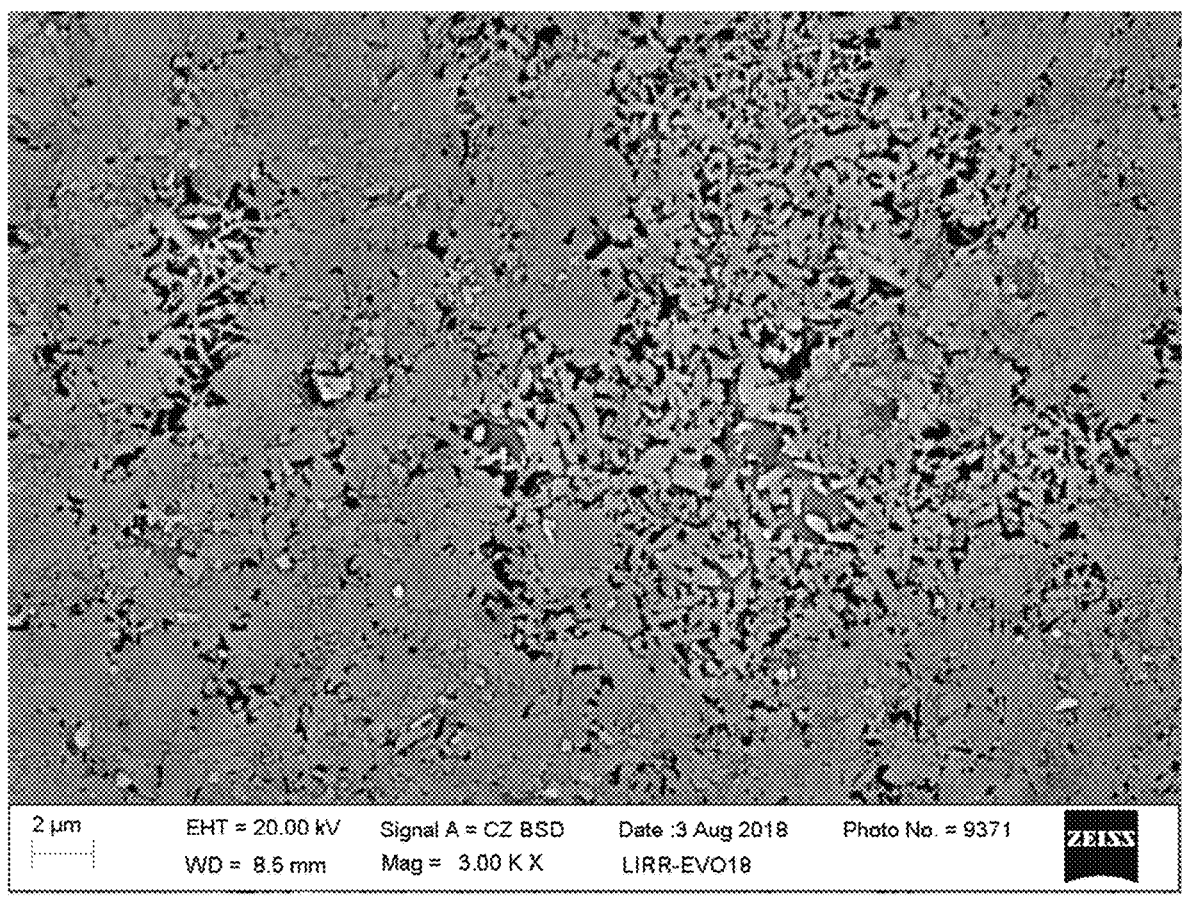
FIG. 1 is an electron microscope scanning analysis diagram of the cross section of the ceramic tracing proppant of Embodiment 3.

The raw materials used in the following examples are all conventional commercially available products.

The bauxite used is mainly composed of the following components in weight percentage: $Al_2O_3$ 50-70%, $SiO_2$<30%, alkali metal oxide<2%; the kaolin used is mainly composed of the following components in weight percentage: $Al_2O_3$ 40-55%, alkali metal oxide<2%; the fluorite used is mainly composed of the following components in weight percentage: $CaF_2$ 50-60%. That is, in the embodiment, in the bauxite used, $Al_2O_3$ 50-70%, $SiO_2$<30%, alkali metal oxide<2%; in the kaolin used, $Al_2O_3$ 40-55%, alkali metal oxide<2%; in the fluorite used, $CaF_2$ 50-60%.

The particle size of the ceramic tracing proppant in the following examples is 20/40 mesh.

Embodiment 1

The ceramic tracing proppant of this embodiment is mainly prepared from the following raw materials in parts by weight: 65 parts of bauxite, 31 parts of kaolin, 1.5 parts of fluorite, and 2.5 parts of a neutron absorbing material. The neutron absorbing material is a mixture of gadolinium oxide, cadmium oxide, and boron carbide, with a mixing ratio of 1:1:1;

The ceramic tracing proppant of this embodiment is prepared by a method comprising the following steps:
1) The bauxite and kaolin are respectively put into a jaw crusher to be crushed to less than 2 cm, and ground to 550 mesh of fineness in a ball mill. Also, the fluorite and the neutron absorbing material are ground to 550 mesh of fineness;
2) Raw materials in parts by weight of 65 parts of bauxite powder, 31 parts of kaolin, 1.5 parts of fluorite, and 2.5 parts of the neutron absorbing material are taken and mixed evenly. The mixed powder is added into a granulator while continuously spraying water mist, granulated, and screened with a 18/40 mesh series drum screen;
3) The screened semi-finished product is dried at 180° C. for 30 minutes, sintered at 1420° C. for 6 hours, cooled to room temperature, and then screened with a 20/40 mesh series vibrating screen to obtain the finished product.

Embodiment 2

The ceramic tracing proppant of this embodiment is different from the ceramic tracing proppant of Embodiment 1 only in that: the ceramic tracing proppant of this embodiment is mainly prepared from the following raw materials in parts by weight: 60 parts of bauxite, 30 parts of kaolin, 1 part of fluorite, and 1 part of the neutron absorbing material. The neutron absorbing material is gadolinium oxide.

Embodiment 3

The ceramic tracing proppant of this embodiment is different from the ceramic tracing proppant of Embodiment 1 only in that: the ceramic tracing proppant of this embodiment is mainly prepared from the following raw materials in parts by weight: 90 parts of bauxite, 90 parts of kaolin, 5 parts of fluorite, and 5 parts of the neutron absorbing material. The neutron absorbing material is cadmium oxide.

Embodiment 4

The ceramic tracing proppant of this embodiment is different from the ceramic tracing proppant of Embodiment 1 only in that: the ceramic tracing proppant of this embodiment is mainly prepared from the following raw materials in parts by weight: 70 parts of bauxite, 60 parts of kaolin, 3 parts of fluorite, and 2 parts of the neutron absorbing material. The neutron absorbing material is boron carbide.

Experimental Example 1

The ceramic tracing proppants of Embodiment 1 to Embodiment 4 are tested for the bulk density, apparent density, and crushing rate, and acid solubility of the ceramic tracing proppants according to the SY/T5108-2014 standard, and the radioactive specific activity external exposure index of natural radionuclides radium-226, thorium-232, and potassium-40 is tested according to the GB6566-2010 "Limits of Radionuclides in Building Materials" standard; the neutron capture ability is tested using the PNN pulsed neutron-neutron logging technology, which includes the following steps:
(1) A pulsed neutron source is used to emit high-energy fast neutrons (energy of 14.1 MeV) into the formation, and thermal neutrons not captured by the formation are detected after the fast neutrons are slowed down by the formation;
(2) Two detectors (that is, long and short source distance detectors) are used to record the thermal neutron counting rate for 2160 μs after the fast neutron beam is emitted, the borehole effect can be effectively removed according to the neutron data recorded in each channel, and the macroscopic neutron capture cross section of the formation is obtained;
(3) According to the long and short source distance counting rates and neutron capture cross section curves, the changes in the formation before and after the ceramic tracing proppant are filled are analyzed, and the neutron capture rate is calculated.

The performance test results of Experimental Example 1 are shown in Table 1 below.

TABLE 1

Performance test results of ceramic tracing proppants in Embodiment 1 to Embodiment 4

| Number | Bulk density g/cm$^3$ | Apparent density g/cm$^3$ | Crushing rate (%) (69 MPa) | Acid solubility (%) | Radioactive Specific activity external exposure index Bq · kg~1 | Neutron capture rate (%) |
|---|---|---|---|---|---|---|
| Embodiment 1 | 1.61 | 2.85 | 4.8 | 5.7 | 1.7 | 99 |
| Embodiment 2 | 1.59 | 2.82 | 4.3 | 5.6 | 1.5 | 98 |

TABLE 1-continued

Performance test results of ceramic tracing proppants in Embodiment 1 to Embodiment 4

| Number | Bulk density g/cm$^3$ | Apparent density g/cm$^3$ | Crushing rate (%) (69 MPa) | Acid solubility (%) | Radioactive Specific activity external exposure index Bq · kg~1 | Neutron capture rate (%) |
|---|---|---|---|---|---|---|
| Embodiment 3 | 1.60 | 2.84 | 4.1 | 5.5 | 1.6 | 99 |
| Embodiment 4 | 1.58 | 2.83 | 4.2 | 5.5 | 1.6 | 99 |

As shown in Table 1, the bulk density of the ceramic tracing proppant of the present invention is 1.58-1.61 g/cm$^3$, the apparent density is 2.82-2.85 g/cm$^3$, and the crushing rate at a pressure of 69 MPa is 4.1-4.8%, which shows that the ceramic tracing proppant of the present invention can have a relatively high compressive strength under a relatively low density. In addition, the ceramic tracing proppant of the present invention also has certain acid corrosion resistance, and the acid solubility thereof is only 5.5-5.7%. After testing, the radioactive specific activity external exposure index of the natural radionuclides radium-226, thorium-232, and potassium-40 in Embodiment 1 to Embodiment 4 is not greater than 1.7, and the neutron capture ability is not less than 98%, which shows that the ceramic tracing proppant of the present invention has low radioactivity, and the relatively strong neutron capture ability can meet the requirement of accurately measuring the crack height.

Experimental Example 2

According to the design requirements of the multi-cluster fracturing construction project of a well in the Jinghe Oilfield of Sinopec, the ceramic tracing proppant of Embodiment 3 is used for fracturing construction for the 8th and 9th sections, which are used for monitoring the multi-cluster fracturing position of the last two sections of the well. In the 8th section, 27 m$^3$ of tracing ceramsite is pressed into the 8th section, and in the 9th section, 28 m$^3$ of tracing ceramsite is pressed into the 9th section. Thermal neutron logging technology is used to test the long and short source distance responses, after removing the influence of the formation, the test crack height is 28 m.

Experimental Example 3

The cross section of the ceramic tracing proppant in Embodiment 3 was subjected to electron microscope scanning analysis, and the results are shown in FIG. 1.

According to FIG. 1, the mullite crystal phase of the ceramic tracing proppant of the embodiment is well developed, and part of it forms a rod-shaped mullite phase with higher strength, which is beneficial to improving the strength of the proppant.

Experimental Example 4

In Embodiment 3, granules were obtained after the screened semi-finished product was dried at 180° C. for 30 minutes in step 3). A cross-section is made after the granules were fixed with resin. The structural diagram of the cross-section is shown in FIG. 2.

Figure 2:
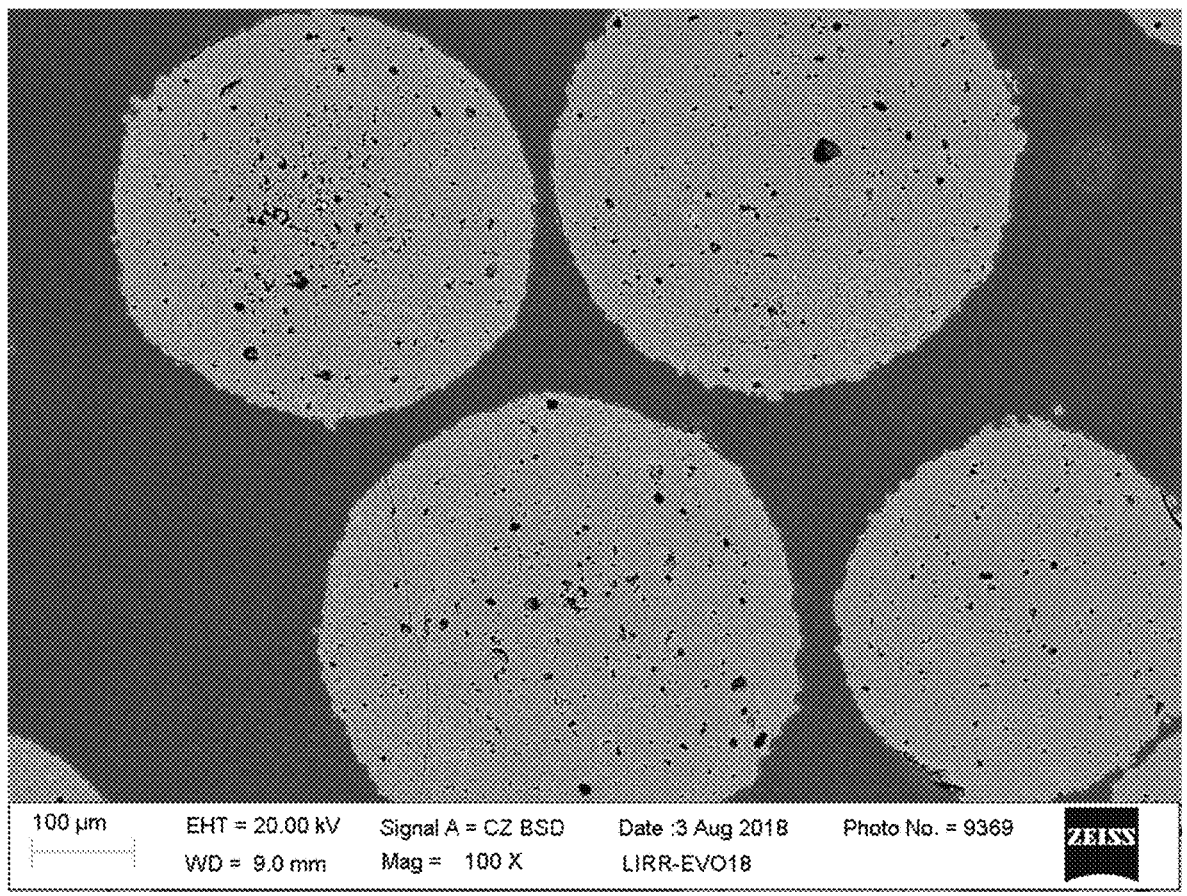
FIG. 2 is a schematic cross-sectional structural diagram of the granules of Embodiment 3 after being fixed with resin.

According to FIG. 2, the macroscopic pore of the ceramic tracing proppant granules based on the raw materials and granulation process of the present invention are small in size and evenly distributed, which is beneficial to improving product strength.

What is claimed is:

1. A ceramic tracing proppant, which comprises a neutron absorbing material and raw materials as follows in parts by weight: 60-90 parts of bauxite, 30-90 parts of kaolin, and 1-5 parts of fluorite,
    wherein the neutron absorbing material is selected from one or any combination of samarium oxide, hafnium oxide, gadolinium oxide, cadmium oxide, and boron carbide.

2. The ceramic tracing proppant according to claim 1, wherein the neutron absorbing material is 1-5 parts in parts by weight.

3. The ceramic tracing proppant according to claim 2, wherein the ceramic tracing proppant comprises raw materials as follows in parts by weight: 60-80 parts of bauxite, 30-40 parts of kaolin, 1-3 parts of fluorite, and 1-4 parts of the neutron absorbing material.

4. The ceramic tracing proppant according to claim 1, wherein the neutron absorbing material comprises boron carbide.

5. He ceramic tracing proppant according to claim 1, wherein the bauxite comprises components as follows in weight percentage: Al$_2$O$_3$ 50-70%, SiO$_2$<30%, alkali metal oxide <2%; the kaolin comprises components as follows in weight percentage: Al$_2$O$_3$ 40-55%, alkali metal oxide <2%; the fluorite comprises components as follows in weight percentage: CaF$_2$ 50-60%.

6. The ceramic tracing proppant according to claim 1, wherein a particle size of the ceramic tracing proppant is 20/40 mesh.

7. The ceramic tracing proppant according to claim 1, wherein the ceramic tracing proppant is prepared by a method comprising steps as follows: granulating a mixed powder composed of a formulated amount of bauxite powder, kaolin powder, fluorite powder, and neutron absorbing material powder, and sintering at 1350-1450° C.

8. The ceramic tracing proppant according to claim 7, wherein a fineness of the bauxite powder, the kaolin powder, the fluorite powder, and the neutron absorbing material powder is 400-600 mesh.

9. The ceramic tracing proppant according to claim 7, wherein a sintering time is 6-10 hours.

\* \* \* \* \*